United States Patent
Lu et al.

(10) Patent No.: US 11,203,541 B2
(45) Date of Patent: Dec. 21, 2021

(54) PARTIAL NITRIFICATION-DENITRIFICATION COUPLED TWO-STAGE AUTOTROPHIC DENITRIFICATION ADVANCED NITROGEN REMOVAL METHOD

(71) Applicants: SUN YAT-SEN UNIVERSITY, Guangdong (CN); SHENZHEN LISAI INDUSTRY DEVELOPMENT CO., LTD., Guangdong (CN); Shenzhen Research Institute of Sun Yat-sen University, Guangdong (CN)

(72) Inventors: Hui Lu, Guangdong (CN); Xingxing Diao, Guangdong (CN); Hequ Peng, Guangdong (CN); Shijun Liu, Guangdong (CN); Qing Zhao, Guangdong (CN); Liao Meng, Guangdong (CN); Naiqiao Song, Guangdong (CN)

(73) Assignees: SUN YAT-SEN UNIVERSITY, Guangzhou (CN); SHENZHEN LISAI INDUSTRY DEVELOPMENT CO., LTD, Shenzhen (CN); Shenzhen Research Institute of Sun Yat-sen Univ., Shenzhen (CN)

( * ) Notice: Subject to any disclaimer, the term of this patent is extended or adjusted under 35 U.S.C. 154(b) by 0 days.

(21) Appl. No.: 16/996,179

(22) Filed: Aug. 18, 2020

(65) Prior Publication Data
US 2020/0377398 A1 Dec. 3, 2020

Related U.S. Application Data

(63) Continuation of application No. PCT/CN2019/089344, filed on May 30, 2019.

(30) Foreign Application Priority Data

May 31, 2018 (CN) .......................... 201810549180.7

(51) Int. Cl.
C02F 3/30 (2006.01)
C02F 3/34 (2006.01)
(Continued)

(52) U.S. Cl.
CPC .............. *C02F 3/305* (2013.01); *C02F 3/307* (2013.01); *C02F 3/34* (2013.01);
(Continued)

(58) Field of Classification Search
CPC .. C02F 3/305; C02F 3/34; C02F 3/307; C02F 2103/06; C02F 2101/166; C02F 2203/002;
(Continued)

(56) References Cited

U.S. PATENT DOCUMENTS

| | | | | |
|---|---|---|---|---|
| 5,232,583 A | * | 8/1993 | Koster | .................. C02F 3/1215 |
| | | | | 210/96.1 |
| 2007/0267346 A1 | * | 11/2007 | Sengupta | .................. C02F 3/28 |
| | | | | 210/610 |

(Continued)

FOREIGN PATENT DOCUMENTS

| CN | 105330023 A | 2/2016 |
|---|---|---|
| CN | 107140735 A | 9/2017 |

(Continued)

*Primary Examiner* — Fred Prince

(57) ABSTRACT

An advanced nitrogen removal method using partial nitrification-denitrification coupled two-stage autotrophic denitrification. Sewage is introduced into a first pool for partial nitrification-denitrification treatment, and then introduced into a first regulating reservoir. Dissolved oxygen content in the first pool is kept at 0.4-0.6 mg/L. Water is discharged when a molar ratio of nitrite nitrogen to ammonia nitrogen in the first regulating reservoir is 1.0-1.3:1. Effluent in the (Continued)

regulating reservoir is introduced into a second pool for anaerobic ammonia oxidation treatment, and then introduced into a second regulating reservoir. In the second pool, pH is 7.0-7.4, a temperature is 22-28° C. Effluent in the second regulating reservoir and sulfides are introduced into a third pool for denitrification treatment. Water is discharged. In the third pool, pH is 7.5-8.0, a temperature is 28-32° C., a mass ratio of sulfur to nitrogen is 1.9-2.0:1.

10 Claims, 2 Drawing Sheets

(51) Int. Cl.
 *C02F 103/06* (2006.01)
 *C02F 101/16* (2006.01)
(52) U.S. Cl.
 CPC .... *C02F 2101/166* (2013.01); *C02F 2103/06* (2013.01); *C02F 2203/002* (2013.01)
(58) Field of Classification Search
 CPC .. C02F 3/345; C02F 3/302; C02F 9/00; C02F 3/006; C02F 2209/15; C02F 2209/16; C02F 2209/14; C02F 2209/22; C02F 2209/06

USPC ................ 210/605, 612, 630, 631, 259, 903
See application file for complete search history.

(56) References Cited

U.S. PATENT DOCUMENTS

| | | | |
|---|---|---|---|
| 2010/0272626 A1* | 10/2010 | Cantwell | C01B 21/02 423/402 |
| 2013/0020257 A1* | 1/2013 | McCarty | C02F 3/302 210/614 |
| 2014/0069864 A1* | 3/2014 | Wett | C02F 3/006 210/605 |
| 2018/0179092 A1* | 6/2018 | Yoshikawa | C02F 3/307 |

FOREIGN PATENT DOCUMENTS

| | | | |
|---|---|---|---|
| CN | 107285465 A | | 10/2017 |
| CN | 107364967 A | | 11/2017 |
| ES | 2466090 A1 | * | 6/2014 |
| JP | H067789 A | | 1/1994 |
| KR | 101875024 B1 | * | 8/2018 |

* cited by examiner

PARTIAL NITRIFICATION-DENITRIFICATION COUPLED TWO-STAGE AUTOTROPHIC DENITRIFICATION ADVANCED NITROGEN REMOVAL METHOD

TECHNICAL FIELD

The present invention belongs to the technical field of advanced nitrogen removal, and particularly relates to a partial nitrification-denitrification coupled two-stage autotrophic denitrification advanced nitrogen removal method.

BACKGROUND OF THE PRESENT INVENTION

Nitrogen substances in sewage may cause serious eutrophication and oxygen lack of water, and produce toxicity to aquatic organisms. Meanwhile, the nitrogen substances in the water may inhibit sterilization and disinfection effects of chlorine. Thus, decrease of nitrogen content in the sewage is very necessary. Due to treatment efficiency and economic feasibility, a biological sewage treatment method has been widely applied to treatment of municipal sewage, industrial wastewater and landfill leachate. Nitrogen removal in a traditional sewage treatment process includes three procedures such as ammoniation, nitrification and denitrification, i.e., organic nitrogen in the water is firstly converted into ammonia nitrogen ($NH_4^+$) in presence of ammonifying bacteria, that is, an ammoniation phase; then a nitrification phase is performed, that is, the ammonia nitrogen is converted into $NO_2^-$ or $NO_3^-$ under an aerobic condition by virtue of nitrosation bacteria and nitrifying bacteria; and finally a denitrification phase is performed, that is, nitrite nitrogen and nitrate nitrogen are converted into nitrogen ($N_2$) by virtue of denitrifying bacteria under an anoxic condition.

In a disposal technology of landfill leachate treatment, at the present stage, leachate treatment and disposal facilities in the vast majority of waste landfills in China are mainly designed according to a level-3 emission standard of Standard for Pollution Control on the Landfill Site of Municipal Solid Waste (GB16889-1997), that is, an up-to-standard emission requirement of COD ($\leq$1000 mg/L) and BOD ($\leq$600 mg/L). Removal of high concentration ammonia nitrogen in the leachate is basically unconsidered. With the enactment and implementation of Standard for Pollution Control on the Landfill Site of Municipal Solid Waste (GB16889-2008), an effluent discharge standard of the landfill leachate treatment is greatly increased (COD$\leq$100 mg/L, ammonia nitrogen$\leq$25 mg/L, and TN$\leq$40 mg/L). Therefore, nitrogen removal treatment of the landfill leachate becomes a problem that cannot be ignored. At present, a common method for treating the landfill leachate is partial nitrification-denitrification nitrogen removal, while treated effluent still contains a small amount of nitrate nitrogen.

Therefore, on an existing basic research, to break through the traditional technology and develop a leachate treatment technology that is low in operating cost, high in treatment efficiency, convenient in operation and maintenance and capable of enabling the effluent to meet the emission standard of Standard for Pollution Control on the Landfill Site of Municipal Solid Waste (GB16889-2008) is urgent.

SUMMARY OF THE PRESENT INVENTION

A purpose of the present invention is to overcome a defect in the prior art that effluent of a landfill leachate treatment technology still contains a small amount of nitrate nitrogen, to provide a partial nitrification-denitrification coupled two-stage autotrophic denitrification advanced nitrogen removal method. The method provided in the present invention has high sewage treatment efficiency. The effluent contains no nitrate nitrogen. An emission standard of Standard for Pollution Control on the Landfill Site of Municipal Solid Waste (GB16889-2008) can be met.

To realize the above purpose of the present invention, the present invention adopts the following technical solutions:

The partial nitrification-denitrification coupled two-stage autotrophic denitrification advanced nitrogen removal method includes the following steps:

S1: introducing sewage into a partial nitrification-denitrification pool to perform partial nitrification-denitrification treatment, then introducing the sewage into a regulating reservoir 1, controlling dissolved oxygen content in the partial nitrification-denitrification pool as 0.4-0.6 mg/L, and discharging water when a molar ratio of nitrite nitrogen to ammonia nitrogen in the regulating reservoir 1 is (1.0-1.3):1;

S2: introducing effluent in the regulating reservoir 1 into an anaerobic ammonia oxidation pool to perform anaerobic ammonia oxidation treatment, then introducing the effluent into a regulating reservoir 2, and controlling a pH value in the anaerobic ammonia oxidation pool to be 7.0-7.4, wherein a temperature is 22-28° C.; and S3: introducing the effluent in the regulating reservoir 2 and 1.1-1.5 g/L of sulfides into a sulfur autotrophic denitrification pool to perform denitrification treatment, discharging water, and controlling a pH value in the sulfur autotrophic denitrification pool to be 7.5-8.0, wherein a temperature is 28-32° C., and a mass ratio of sulfur to nitrogen is (1.9-2.0):1.

According to the present invention, the sewage is subjected to partial nitrification-denitrification, anaerobic ammonia oxidation and denitrification treatment in combination with the partial nitrification-denitrification pool, the anaerobic ammonia oxidation pool and the sulfur autotrophic denitrification pool, and the water entry and effluent conditions of each reaction pool and other reaction conditions are controlled by the regulating reservoirs 1 and 2 so that the ammonia nitrogen content in the finally treated effluent is decreased to be less than 10 mg/L; the nitrate nitrogen content is decreased to be less than 5 mg/L; the effluent meets the emission standard of Standard for Pollution Control on the Landfill Site of Municipal Solid Waste (GB16889-2008); and the treatment efficiency is high.

In the present invention, based on N, the nitrate nitrogen is $NO_3^-$—N, the nitrite nitrogen is $NO_2^-$—N, and the ammonia nitrogen is $NH_4^+$—N. The sulfide refers to sodium sulfide. Concentrations of the nitrate nitrogen, the nitrite nitrogen and the ammonia nitrogen are calculated based on nitrogen; and the mass ratio of the sulfur to nitrogen is a mass ratio of sulfur to nitrate nitrogen.

The method provided in the present invention can treat various kinds of sewage, particularly landfill leachate having a higher emission standard.

Preferably, the sewage in the S1 is landfill leachate.

Preferably, the dissolved oxygen content in the S1 is 0.5 mg/L.

Preferably, in the S1, after the sewage is subjected to partial nitrification-denitrification treatment, the molar ratio of the nitrite nitrogen to the ammonia nitrogen is (1.0-1.3):1.

Preferably, water is discharged when the molar ratio of the nitrite nitrogen to the ammonia nitrogen in the regulating reservoir 1 is 1.2:1.

Preferably, in the S2, the effluent subjected to anaerobic ammonia oxidation treatment flows back to the regulating reservoir 1, so that a total nitrogen concentration in the regulating reservoir 1 is 500-600 mg/L. More preferably, the total nitrogen concentration in the regulating reservoir 1 is 500 mg/L.

The total nitrogen in the present invention refers to the sum of the nitrate nitrogen, the nitrite nitrogen and the ammonia nitrogen, and is calculated base on the mass of N.

The effluent subjected to anaerobic ammonia oxidation treatment flows back to the regulating reservoir 1 to regulate the total nitrogen, so that reaction efficiency of the anaerobic ammonia oxidation pool can be further increased.

Preferably, in the S3, a molar ratio of sulfur to nitrogen is 2:1.

Preferably, in the S3, effluent in the sulfur autotrophic denitrification pool flows back to the regulating reservoir 2, so that a nitrate nitrogen concentration in the regulating reservoir 2 is 90-120 mg/L. More preferably, the nitrate nitrogen concentration in the regulating reservoir 2 is 70-120 mg/L.

Preferably, in the S3, the sulfide is sodium sulfide; and more preferably, the sodium sulfide is derived from hydrogen sulfide produced in a waste landfill.

The hydrogen sulfide produced in the waste landfill is converted into the sodium sulfide and applied to the present invention. Thus, hydrogen sulfide emission in the waste landfill can be decreased.

Compared with the prior art, the present invention has beneficial effects as follows:

In the present invention, the sewage is subjected to partial nitrification-denitrification, anaerobic ammonia oxidation and denitrification treatment in combination with the partial nitrification-denitrification pool, the anaerobic ammonia oxidation pool and the sulfur autotrophic denitrification pool, and the water entry and effluent conditions of each reaction pool and other reaction conditions are controlled so that the ammonia nitrogen content in the finally treated effluent is decreased to be less than 10 mg/L; the nitrate nitrogen content is decreased to be less than 5 mg/L; the effluent meets the emission standard of Standard for Pollution Control on the Landfill Site of Municipal Solid Waste (GB16889-2008); and the treatment efficiency is high.

DETAILED DESCRIPTION OF THE PRESENT INVENTION

The present invention is further illustrated below in combination with embodiments. These embodiments are merely used for describing the present invention, rather than limiting the scope of the present invention. Experimental methods without specific indicated conditions in embodiments below are generally performed in accordance with conventional conditions in the art or in accordance with conditions suggested by manufacturers. Unless otherwise specified, used raw materials, reagents and the like are all raw materials and reagents obtained from commercial approaches such as conventional markets. Any insubstantial changes and replacements made by those skilled in the art on the basis of the present invention belong to the protection scope of the present invention.

Embodiments 1-3

Landfill leachate of a certain waste landfill serves as a sewage source for treatment. The landfill leachate has COD content of 4000-5000 mg/L, and an ammonia nitrogen concentration of 2500-3000 mg/L. The landfill leachate collected in a storage pond is treated to obtain percolate, and the percolate is delivered into a partial nitrification-denitrification pool to react. Various conditions of the percolate are shown in the following Table 1.

Figure 1:
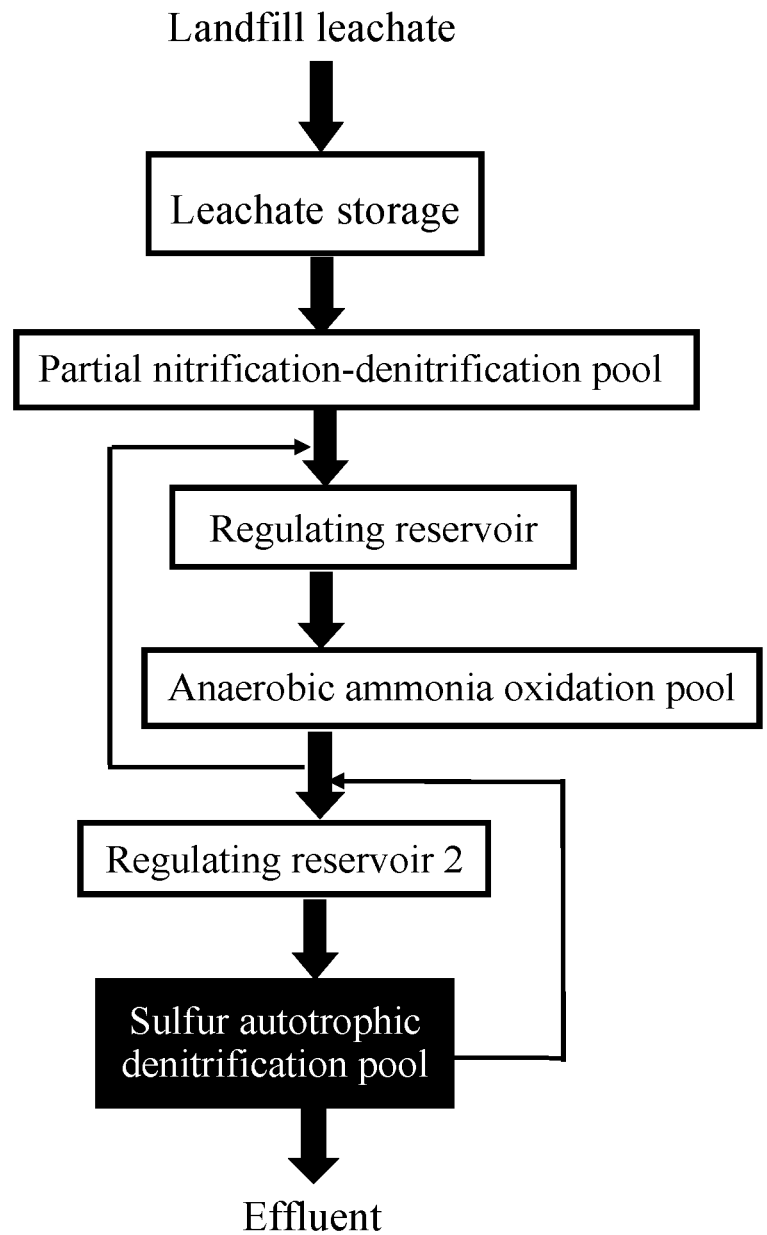
FIG. 1 is a process flowchart of a partial nitrification-denitrification coupled two-stage autotrophic denitrification advanced nitrogen removal method.
Figure 2:
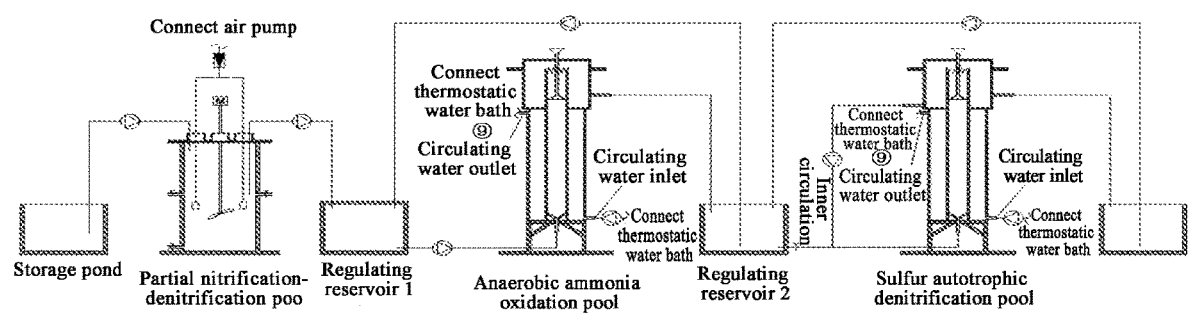
FIG. 2 is a systematic schematic diagram of a partial nitrification-denitrification coupled two-stage autotrophic denitrification advanced nitrogen removal method.

Process flow charts of a partial nitrification-denitrification coupled two-stage autotrophic denitrification advanced nitrogen removal method provided by Embodiments 1-3 are as shown in FIGS. 1 and 2. Specific steps are as follows:

The percolate serving as sewage was introduced (unrestrictive aeration) into the partial nitrification-denitrification pool for 10 min, and stirred for 10 h 50 min (aeration was performed at the same time, and DO was controlled as 0.4-0.6 mg/L); precipitation was performed for 0.5 h; water was discharged for 10 min; standing was performed for 20 min; a cyclic water treatment quantity was 1 L; two cycles were operated every day, that is, a daily water treatment quantity of 2 L served as an operating condition of the partial nitrification-denitrification pool; and the effluent was introduced into a regulating reservoir 1. Meanwhile, water quality fluctuation of the effluent in the partial nitrification-denitrification pool was considered; an external reflux ratio of the pool was set as 3, that is, a total concentration of $NH_4^+$—N and $NO_2^-$—N in the regulating reservoir 1 was controlled as about 500-600 mg/L; a pH value of the effluent was 7.0-7.5; and HRT of the pool was equal to 3 h. The effluent was further treated by utilizing an anaerobic ammonia oxidation pool and discharged, and introduced into a regulating reservoir 2. 4 L of effluent in a sulfur autotrophic denitrification pool flowed back to the regulating reservoir, so that the $NO_3^-$—N concentration was 70-120 mg/L. The adding amount of sodium sulfide was determined according to the $NO_3^-$—N concentration, so that a mass ratio of sulfur to nitrogen is 1.9-2.0. A pH value was controlled as 7.5±0.1, and a temperature was 30±1° C. Through the sulfur autotrophic denitrification pool, the $NO_3^-$—N was further removed, and sulfide ions were fully removed. Condition setting and treatment results of various embodiments are as shown in the following Table 1.

References Examples 1-2

The references examples 1-2 provide a partial nitrification-denitrification coupled two-stage autotrophic denitrification advanced nitrogen removal method. In the method provided by reference example 1, dissolved oxygen content in the partial nitrification-denitrification pool is controlled as 0.3 mg/L, and other conditions are consistent with those in Embodiment 1; and in the method provided by reference example 2, a mass ratio of sulfur to nitrogen in the sulfur autotrophic denitrification pool is controlled as 2.5:1, and other conditions are consistent with those in Embodiment 1. Condition setting and treatment results of reference examples 1-2 are as shown in the following Table 1.

TABLE 1

Condition setting and treatment results of the method provided by embodiments 1-3 and reference examples 1-2

|  |  | Embodiments | | | Reference Examples | |
|---|---|---|---|---|---|---|
| Condition/treatment results | | 1 | 2 | 3 | 1 | 2 |
| | Initial $NHC_4^+$—N concentration (mg/L) | 1338.53 | 1338.53 | 1338.53 | 1338.53 | 1338.53 |
| | Initial $NO_2^-$N (mg/L) | 974.85 | 974.85 | 974.85 | 974.85 | 974.85 |
| | Initial $NO_3^-$—N concentration (mg/L) | 246.88 | 246.88 | 246.88 | 246.88 | 246.88 |
| | Initial COD concentration (mg/L) | 3944.18 | 3944.18 | 3944.18 | 3944.18 | 3944.18 |
| | Initial basicity (mg/L) | 4156 | 4156 | 4156 | 4156 | 4156 |
| | Dissolved oxygen content (DO, mg/L) | 0.5 | 0.4 | 0.6 | 0.3 | 0.5 |
| | Molar ratio of $NH_4^+$—N to $NO_2^-$N in effluent | 1.2 | 1.3 | 1.0 | 1.4 | 1.2 |
| | Concentration of $NH_4^+$—N in effluent (mg/L) | 31.88 | 29.54 | 32.64 | 58.75 | 31.88 |
| | Removal rate of $NH_4^+$—N | 87.7% | 91.5% | 93.2% | 75.6% | 87.7% |
| | Concentration of $NO_2^-$—N in effluent (mg/L) | 14.03 | 10.96 | 13.48 | 35.7 | 14.03 |
| | Removal rate of $NO_2^-$N | 94.9% | 96.2% | 93.6% | 87.3% | 94.9% |
| | Concentration of $NO_3^-$N in effluent (mg/L) | 221.42 | 212.51 | 205.36 | 265.43 | 221.42 |
| Regulating reservoir 1 | Total nitrogen content (mg/L) | 550 | 500 | 600 | 550 | 550 |
| Anaerobic ammonia oxidation pool | $NH_4^+$—N removal rate (accumulated) | 98.8% | 99.6% | 98.6% | 84.6% | 98.8% |
| | TN removal rate | 90.2% | 91.5% | 92.5% | 81.4% | 90.2% |
| | COD removal rate | 45.7% | 51% | 48% | 44% | 45.7% |
| Regulating reservoir 2 | $NO_3^-$—N concentration | 90 | 70 | 120 | 110 | 90 |
| | Sulfur-nitrogen mass ratio | 2.0 | 1.9 | 1.95 | 1.8 | 2.5 |
| | COD removal rate | 51% | 49% | 51% | 47% | 46.5% |
| Sulfur autotrophic denitrification pool | Sulfur removal rate | 100% | 100% | 100% | 100% | 100% |
| | Ammonia nitrogen concentration of effluent (mg/L) | <5 | <5 | <5 | <20 | <30 |
| | Nitrate nitrogen concentration of effluent (mg/L) | <5 | <5 | <5 | <20 | <20 |
| | $NO_3^-$—N removal rate | 95.3% | 96.1% | 95.9% | 81.7% | 83.5% |

It can be seen from Table 1 that, according to the method provided by embodiments 1-3, the removal rate of $NO_3^-$—N in the effluent of the anaerobic ammonia oxidation pool treated by the sulfur autotrophic denitrification pool is up to 95%; and sulfur removal efficiency is up to 100%. After the landfill leachate is subjected to advanced nitrogen removal by a partial nitrification-denitrification coupled two-stage autotrophic denitrification process, the COD, the ammonia nitrogen and the total nitrogen are further removed. The ammonia nitrogen content in the effluent is decreased to be less than 10 mg/L; the nitrate nitrogen content is decreased to be less than 5 mg/L; and the effluent meets the emission standard of Standard for Pollution Control on the Landfill Site of Municipal Solid Waste (GB16889-2008). However, according to the method provided by reference examples, the concentrations of the ammonia nitrogen and nitrite nitrogen in the effluent and the nitrate nitrogen are higher than those in the embodiments, and the total nitrogen in the effluent is difficult to meet the latest emission requirement. Therefore, compared with the reference examples, the embodiments have excellent operating effects.

We claim:

1. A partial nitrification-denitrification coupled two-stage autotrophic denitrification advanced nitrogen removal method, comprising the following steps:
   S1: introducing sewage into a partial nitrification-denitrification pool to perform partial nitrification-denitrification treatment, then introducing the sewage into a regulating reservoir 1, controlling dissolved oxygen content in the partial nitrification-denitrification pool as 0.4-0.6 mg/L, and discharging water when a molar ratio of nitrite nitrogen to ammonia nitrogen in the regulating reservoir 1 is (1.0-1.3):1;
   S2: introducing effluent in the regulating reservoir 1 into an anaerobic ammonia oxidation pool to perform anaerobic ammonia oxidation treatment, then introducing the effluent into a regulating reservoir 2, and controlling a pH value in the anaerobic ammonia oxidation pool to be 7.0-7.4, wherein a temperature is 22-28° C.;
   S3: introducing the effluent in the regulating reservoir 2 and 1.1-1.5 g/L of sulfides into a sulfur autotrophic denitrification pool to perform denitrification treatment, discharging water, and controlling a pH value in the sulfur autotrophic denitrification pool to be 7.5-8.0, wherein a temperature is 28-32° C., and a mass ratio of sulfur to nitrogen is (1.9-2.0):1.

2. The method according to claim 1, wherein the sewage in the S1 is landfill leachate.

3. The method according to claim 1, wherein the dissolved oxygen content in the S1 is 0.5 mg/L.

4. The method according to claim 1, wherein in the S1, after the sewage is subjected to partial nitrification-denitrification treatment, the molar ratio of the nitrite nitrogen to the ammonia nitrogen is (1.0-1.3):1.

5. The method according to claim 1, wherein water is discharged when the molar ratio of the nitrite nitrogen to the ammonia nitrogen in the regulating reservoir 1 is 1.2:1.

6. The method according to claim 1, wherein in the S2, the effluent subjected to anaerobic ammonia oxidation treatment flows back to the regulating reservoir 1, so that a total nitrogen concentration in the regulating reservoir 1 is 500-600 mg/L.

7. The method according to claim 1, wherein in the S3, a mass ratio of sulfur to nitrogen is 2:1.

8. The method according to claim 1, wherein in the S3, effluent in the sulfur autotrophic denitrification pool flows back to the regulating reservoir 2, so that a nitrate nitrogen concentration in the regulating reservoir 2 is 90-120 mg/L.

9. The method according to claim 1, wherein in the S3, the sulfide is sodium sulfide.

10. The method according to claim 9, wherein the sodium sulfide is derived from hydrogen sulfide produced in a waste landfill.

\* \* \* \* \*